United States Patent
Teboulle et al.

(10) Patent No.: US 10,367,720 B2
(45) Date of Patent: Jul. 30, 2019

(54) METHOD FOR OBTAINING A POWERLINE COMMUNICATION ROUTE

(71) Applicant: SAGEMCOM ENERGY & TELECOM SAS, Rueil Malmaison (FR)

(72) Inventors: Henri Teboulle, Rueil Malmaison (FR); Ziv Roter, Rueil Malmaison (FR)

(73) Assignee: SAGEMCOM ENERGY & TELECOM SAS, Rueil Malmaison (FR)

(*) Notice: Subject to any disclaimer, the term of this patent is extended or adjusted under 35 U.S.C. 154(b) by 31 days.

(21) Appl. No.: 15/576,742

(22) PCT Filed: May 20, 2016

(86) PCT No.: PCT/EP2016/061388
§ 371 (c)(1),
(2) Date: Nov. 24, 2017

(87) PCT Pub. No.: WO2016/188889
PCT Pub. Date: Dec. 1, 2016

(65) Prior Publication Data
US 2018/0167309 A1    Jun. 14, 2018

(30) Foreign Application Priority Data
May 26, 2015    (FR) .................................... 15 54680

(51) Int. Cl.
*H04L 12/733*    (2013.01)
*H04L 29/06*    (2006.01)
(Continued)

(52) U.S. Cl.
CPC .......... *H04L 45/122* (2013.01); *H04B 3/542* (2013.01); *H04L 45/54* (2013.01); *H04L 47/122* (2013.01);
(Continued)

(58) Field of Classification Search
None
See application file for complete search history.

(56) References Cited

U.S. PATENT DOCUMENTS

| | | | |
|---|---|---|---|
| 9,008,073 B1* | 4/2015 | Razazian | H04L 45/122 370/238 |
| 2012/0182881 A1 | 7/2012 | Ananthakrishnan et al. | |
| 2014/0181279 A1* | 6/2014 | Louis | H04W 12/02 709/222 |

OTHER PUBLICATIONS

Jul. 13, 2016 Search Report issued in International Patent Application No. PCT/EP2016/061388.
(Continued)

*Primary Examiner* — Kouroush Mohebbi
(74) *Attorney, Agent, or Firm* — Oliff PLC; R. Brian Drozd

(57) ABSTRACT

Method for obtaining an initial communication route between a node device and a data concentrator device in a network using powerline communications based on a communication protocol including a method for seeking an initial communication route, the method including the following steps: obtaining information representing a risk of overloading of said network; applying the method for seeking an initial communication route in order to determine the initial communication route when the information representing the risk of overloading of the network indicates that the network does not risk being overloaded.

11 Claims, 5 Drawing Sheets

(51) Int. Cl.
  *H04B 3/54*    (2006.01)
  *H04L 12/741*   (2013.01)
  *H04L 12/803*   (2013.01)
  *H04L 12/761*   (2013.01)

(52) U.S. Cl.
  CPC ............ *H04L 47/125* (2013.01); *H04L 63/08* (2013.01); *H04L 45/16* (2013.01)

(56) References Cited

OTHER PUBLICATIONS

Bersani France Telecom R&D H Tschofenig Seimens Networks GMBH & CO KG F; "The EAP-PSKK Protocol: A Pre-Shared Key Extensible Authentication Protocol (EAP) Method;" rfc4764.txt; JCT-VC Meeting; 96. MPEG Meeting; Mar. 16, 2011-Mar. 23, 2011; Geneva; Joint Collaborative Team on Video Coding of ISO/IEC JTC1/SC29/WG11 and ITU-T SG.16; Jan. 2007; XP015055052; 64 pp.

Razazian et al; "Enhanced 6LoWPAN Ad Hoc Routing for G3-PLC;" 2013 IEEE 17th International Symposium on Power Line Communications and Its Applicantions; Mar. 24, 2013; pp. 137-142.

\* cited by examiner

METHOD FOR OBTAINING A POWERLINE COMMUNICATION ROUTE

The present invention relates to a method for obtaining an initial communication route between a node device and a data concentrator device in a meshed network using powerline communications, and a system and devices able to implement said method.

Powerline communications (PLCs) are developing, in particular in the context of electrical supply networks of the AMM (automated meter management) type. Communication networks are thus implemented on top of electrical supply networks for the automated collection, from smart meters, of electrical energy reading data. Powerline communications use, for example, communication protocols such as the G3-PLC protocol (third generation PLC, ITU-T G.9903) or PRIME protocol (PowerLine Intelligent Metering Evolution).

Such PLC networks may have a tree form or a meshed form to allow to extend the scope of the communications. This is the case for example in PLC networks using the PRIME protocol or the G3-PLC protocol. The devices in such PLC networks are generally referred to as nodes. A node device, referred to as a data concentrator device, manages the PLC network so as to organise the sharing of the same communication medium: transmission of synchronisation beacons, topology management, authentication, management of temporary local addressing in the managed network, etc. Node devices, generally smart meters, then serve as a relay on behalf of other node devices in the PLC network, i.e. other smart meters, when the latter do not manage to directly receive information from the data concentrator, and to directly transmit information to the data concentrator.

A plurality of relays may thus be necessary to enable a node device to communicate with the data concentrator.

The insertion of a new node device in a PLC network comprises the establishment of a communication route between said node device and the data concentrator device. To do this, the G3-PLC protocol, for example, provides a method for seeking an initial communication route enabling the node device, in collaboration with the data concentrator device, to determine which is the best communication route at a given moment between the node device and the data concentrator device. When this method is used, all the possible communication routes between the node device and the data concentrator device are envisaged compared by means of a cost function defined by the G3-PLC protocol or left to the choice of a programmer. The communication route minimising the cost function is then chosen for each exchange of messages between the node device and the data concentrator device. However, the method for seeking an initial communication route may prove to be expensive in terms of use of an available bandwidth in the PLC network. It comprises in fact a phase of seeking a best communication route during which the data concentrator device transmits a route request in broadcast mode in the PLC network. Several simultaneous implementations of the phase of seeking a best communication route by a plurality of node devices may cause very significant use of bandwidth, to the point of causing overloads of the PLC network. Frequently, for example, a PLC network is overloaded during phases of initialisation or reinitialisation of the PLC network since, in this case, all the node devices in the PLC network must determine a communication route to the data concentrator device. To do this, the data concentrator device sends almost simultaneously a route request in broadcast mode in the direction of each node device in the PLC network.

It is desirable to overcome these various drawbacks of the prior art.

It is in particular desirable to propose a method for avoiding overloads on the PLC network when a plurality of node devices must simultaneously determine a communication route to the data concentrator device.

It is in particular desirable to provide a solution that is simple to implement and at low cost.

According to a first aspect of the present invention, the present invention relates to a method for obtaining an initial communication route between a node device and a data concentrator device in a network using powerline communications based on a communication protocol comprising a method for seeking an initial communication route, said method comprising a first phase, referred to as the authentication phase, during which a first device wishing to establish a communication route to a second device sends an authentication message to said second device, in response to which said second device transmits a message to said first device comprising a short address attributed to said first device in a format that cannot be interpreted by an intermediate device in the network via which said message will pass, said short address being used for each exchange of messages between the first and second devices following the authentication phase, a second phase, referred to as the phase for seeking a best communication route, during which said second device sends a route request in broadcast mode in the network, and a third phase, referred to as the route confirmation phase, during which the first device transmits a message to the second device comprising information representing a communication route selected in accordance with a predefined criterion, said method comprising the following steps: obtaining information representing a risk of overloading of said network; applying said method for seeking an initial communication route in order to determine the initial communication route when the information representing the risk of overloading of said network indicates that said network does not risk being overloaded.

The use of the method for seeking an initial communication route therefore depends on the risk of overloading of the network. When the network risks being overloaded, the method for seeking an initial communication route is not used. The method according to the invention therefore avoids actually overloading the network. The method for seeking an initial communication route can be used when the risk of overloading of the network has decreased.

In one embodiment, when the network risks being overloaded, an alternative method of seeking an initial communication route is used, comprising a phase during which the node device and the data concentrator device exchange in unicast mode a message comprising said short address in a format that can be interpreted by an intermediate device in the network via which said message will pass so that each intermediate device through which said message passes can recover said short address and store an initial communication route between the node device and the data concentrator device using said short address, said short address being used for each communication between the node device and the data concentrator device following said phase.

In this way a route is defined between the node device and the data concentrator device. Use of this route enables the node device and the data concentrator device to communicate, until a better route is defined by use of the phase for seeking a best communication route.

In one embodiment, the alternative method for seeking an initial communication route comprises a first phase, referred to as the alternative authentication phase, during which the node device sends an authentication message to the data concentrator device, in response to which said data concentrator device transmits a message to said node device comprising a short address attributed to the node device in a format that can be interpreted by an intermediate device in the network via which said message will pass.

In this way, each node device through which the message comprising the short address in a format that can be interpreted by an intermediate device passes can recover the short address attributed to the node device and store a communication route between the node device and the data concentrator device using said short address. Subsequently, when the intermediate device receives a message in which the address of the destination is the short address of the node device, it can route said message to the node device.

In one embodiment, the alternative method for seeking an initial communication route comprises two phases, a first phase corresponding to the authentication phase and a second phase corresponding to the route confirmation phase, the first phase and the second phase being consecutive.

By enabling the use of a route confirmation phase without a prior use of a phase for seeking a best communication route, causing an overloading of the network is prevented. The short address of the node device appearing in a format that can be interpreted by an intermediate device in the messages exchanged during the route confirmation phase, each node device through which said messages pass can recover the short address attributed to the node device and store it in a routing table. Subsequently, when the intermediate device receives a message in which the address of the destination is the short address of the node device, it can route said message to the node device.

In one embodiment, said second phase corresponding to the route confirmation phase is used as soon as a message containing the first phase corresponding to the authentication phase is received by the node device.

In one embodiment, the communication protocol is the G3-PLC protocol.

According to a second aspect of the present invention, the invention relates to a method for obtaining an initial communication route between a node device and a data concentrator device, the node device and the data concentrator device being included in a network using powerline communications based on a communication protocol comprising a method for seeking an initial communication route, said method comprising a first phase, referred to as the authentication phase, during which a first device using the method and wishing to establish a communication route to a second device sends an authentication message to said second device, in response to which the first device receives a message comprising a short address attributed to the first device by the second device in a format that cannot be interpreted by an intermediate device in the network via which said message will pass, said short address being used for each exchange of messages between the first and second devices following the authentication phase, a second phase, referred to as the phase for seeking a best communication route, during which the first device selects a best communication route in accordance with a predefined criterion from a set of possible communication routes between the first device and the second device, and a third phase, referred to as the route confirmation phase, during which the first device transmits a message to the second device comprising information representing the best communication route selected, said method comprising the following steps: obtaining information representing a risk of overloading of said network; applying said method for seeking an initial communication route for determining the initial communication route when the information representing the risk of overloading of said network indicates that said network does not risk being overloaded.

According to a third aspect of the present invention, the invention relates to a method for obtaining an initial communication route between a node device and a data concentrator device, the data concentrator device and the node device being included in a network using powerline communications based on a communication protocol comprising a method for seeking an initial communication route, said method comprising a first phase, referred to as the authentication phase, during which a second device using said method receives a message for authentication of a first device wishing to establish a communication route with the second device, in response to which the second device transmits a message to the first device comprising a short address attributed to the first device in a format that cannot be interpreted by an intermediate device in the network via which said message will pass, said short address being used for each exchange of messages between the first and second device following the authentication phase, a second phase, referred to as the phase for seeking a best communication route, during which the second device sends a route request in broadcast mode in the network, and a third phase, referred to as the route confirmation phase, during which the second device receives a message from the first device comprising information representing a best communication route selected by the first device in accordance with a predefined criterion, said method comprising the following steps: obtaining information representing a risk of overloading of said network; applying said method for seeking an initial communication route in order to obtain the information representing the initial communication route when the information representing the risk of overloading of said network indicates that said network does not risk being overloaded.

According to a fourth aspect of the present invention, the invention relates to a system suitable for obtaining an initial communication route, said system being included in a network using powerline communications based on a communication protocol comprising a method for seeking an initial communication route, said method comprising a first phase, referred to as the authentication phase, during which a first device wishing to establish a communication route to a second device sends an authentication message to the second device, in response to which the second device transmits a message to the first device comprising a short address attributed to the first device in a format that cannot be interpreted by an intermediate device in the network via which said message will pass, said short address being used for each exchange of messages between the first and second devices following the authentication phase, a second phase, referred to as the phase for seeking a best communication route, during which the second device sends a route request in broadcast mode in the network, and a third phase, referred to as the route confirmation phase, during which the first device transmits a message to the second device comprising information representing a best communication route selected in accordance with a predefined criterion, said system comprising the following means: obtaining means for obtaining information representing a risk of overloading of said network; processing means for applying said method for seeking an initial communication route for determining the initial communication route when the information representing the risk of overloading of said network indicates that said network does not risk being overloaded.

According to a fifth aspect of the present invention, the invention relates to a node device suitable for obtaining an initial communication route to a data concentrator device, said node device and said data concentrator device being included in a network using powerline communications based on a communication protocol comprising a method for seeking an initial communication route, said method comprising a first phase, referred to as the authentication phase, during which a first device using the method and wishing to establish a communication route to a second device sends an authentication message to said second device, in response to which the first device receives a message comprising a short address attributed to the first device by the second device in a format that cannot be interpreted by an intermediate device in the network via which said message will pass, said short address being used for each exchange of messages between the first and second devices following the authentication phase, a second phase, referred to as the phase for seeking a best communication route, during which the first device selects a best communication route in accordance with a predefined criterion from a set of possible communication routes between the first device and the second device, and a third phase, referred to as the route confirmation phase, during which the first device transmits a message to the second device comprising information representing the best communication route selected, said node device comprising the following means: obtaining means for obtaining information representing a risk of overloading of said network;

processing means for applying said method for seeking an initial communication route in order to determine the initial communication route when the information representing the risk of overloading of said network indicates that said network does not risk being overloaded.

According to a sixth aspect of the present invention, the invention relates to a data concentrator device suitable for obtaining an initial communication route between a node device and the data concentrator device, the data concentrator device and the node device being included in a network using powerline communications based on a communication protocol comprising a method for seeking an initial communication route, said method comprising a first phase, referred to as the authentication phase, during which a second device using the method receives an authentication message from a first device wishing to establish a communication route with the second device, in response to which said second device transmits a message to said first device comprising a short address attributed to the first device by the second device in a format that cannot be interpreted by an intermediate device in the network via which said message will pass, said short address being used for each exchange of messages between the first and second devices following the authentication phase, a second phase, referred to as the phase for seeking a best communication route, during which the second device sends a route request in broadcast mode in the network, and a third phase, referred to as the route confirmation phase, during which the second device receives a message from the first device comprising information representing a best communication route selected by the first device in accordance with a predefined criterion, said data concentrator device comprising the following means: obtaining means for obtaining information representing a risk of overloading of said network; processing means for applying said method for seeking an initial communication route in order to obtain the information representing the initial communication route when the information representing the level of loading of said network indicates that said network does not risk being overloaded.

According to a seventh aspect of the present invention, the invention relates to a computer program comprising instructions for the implementation, by a device, of the method according to the second or third aspect, when said program is executed by a processor of said device.

According to an eighth aspect of the present invention, the invention relates to storage means storing a computer program comprising instructions for the implementation, by a device, of the method according to the second or third aspect, when said program is executed by a processor of said device.

The features of the invention mentioned above, as well as others, will emerge more clearly from a reading of the following description of an example embodiment, said description being given in relation to the accompanying drawings, among which:

The invention is described hereinafter in a context in which an electricity supply network on which a PLC network is implemented comprises a data concentrator connected to a plurality of node devices of the electricity meter type by electrical supply cables. The communications made in this PLC network use the G3-PLC protocol.

The invention also applies in a broader context. The invention applies in particular in the case of the use of any other powerline communication protocol providing, when a communication route must be determined between two devices in a PLC network, a transmission of messages in broadcast mode in the PLC network.

Moreover, the invention applies particularly in the case of an initialisation or reinitialisation of the PLC network, the initialisation or reinitialisation of the PLC network having been able to be caused, for example, by an electrical supply cut in the PLC network. However, the invention also applies whenever a large number of node devices in a PLC network must simultaneously reinitialise their communication route with a data concentrator device. For example, the invention applies when a data concentrator device fails and/or is replaced, in which case all the node devices seek to authenticate themselves with a replacement data concentrator device or an adjacent concentrator device.

In addition, the invention is described in the context of a tree network in which node devices communicate with a data concentrator device having the role of root in the PLC network. The invention also applies in other types of CPL network in which communication routes are to be determined, such as meshed PLC networks.

Figure 1:
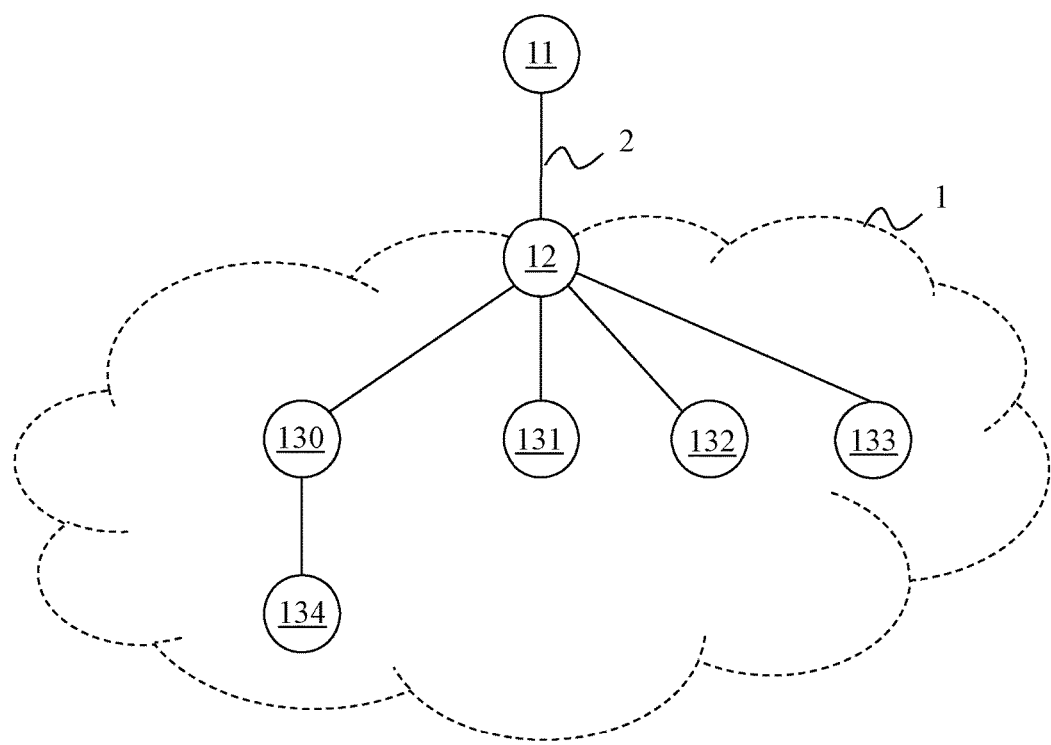
FIG. 1 illustrates schematically an example of a PLC network in tree form implemented on an electrical supply network in which the invention can be implemented.

FIG. 1 illustrates schematically an example of a PLC network 1 in tree form implemented in an electricity supply network in which the invention can be implemented.

Said PLC network 1 comprises a data concentrator device 12 connected to a plurality of node devices 130 to 134 of the electricity meter type. Each electricity meter supervises an electrical installation and measures an electrical energy consumed in said electrical installation. The electricity meters 130 to 133 are connected directly to the data concentrator device 12. The electricity meter 130 serves as a relay for the electricity meter 134. The data concentrator device 12 is connected to an information system 11 by a communication network 2 such as for example the internet. In one embodiment, PLC communications are implemented in the PLC network 1 using the G3-PLC protocol.

Figure 2A:
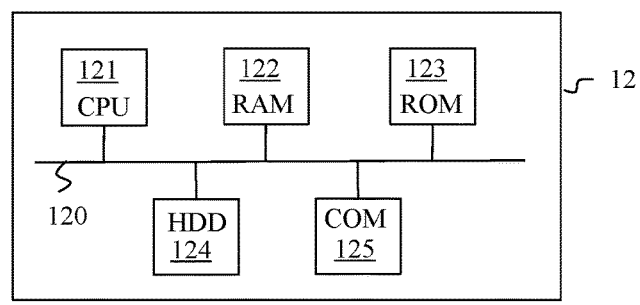
FIG. 2A illustrates schematically an example of hardware architecture of a data concentrator device in the PLC network.

FIG. 2A illustrates schematically an example of hardware architecture of the data concentrator device 12 of the PLC network 1 implementing the invention. It should be noted that FIG. 2A could also illustrate schematically an example of hardware architecture of a processing module included in the data concentrator device 12 and implementing the invention.

According to the example of hardware architecture depicted in FIG. 2A, the data concentrator device 12 then comprises, connected by a communication bus 120: a processor or CPU (central processing unit) 121; a random access memory RAM 122; a read only memory ROM 123; a storage unit such as a hard disk or a storage medium reader, such as an SD (secure digital) card reader 124; at least one communication interface 125 enabling the data concentrator device to communicate with the node devices 130 to 134.

The processor 121 is capable of executing instructions loaded into the RAM 122 from the ROM 123, from an external memory (not shown), from a storage medium (such as an SD card), or from a communication network. When the data concentrator device 12 is powered up, the processor 121 is capable of reading instructions from the RAM 122 and executing them. These instructions form a computer program causing the implementation, by the processor 121, of all or part of the method described below in relation to FIGS. 3 to 6.

The method described below in relation to FIGS. 3 to 6 may be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

Figure 2B:
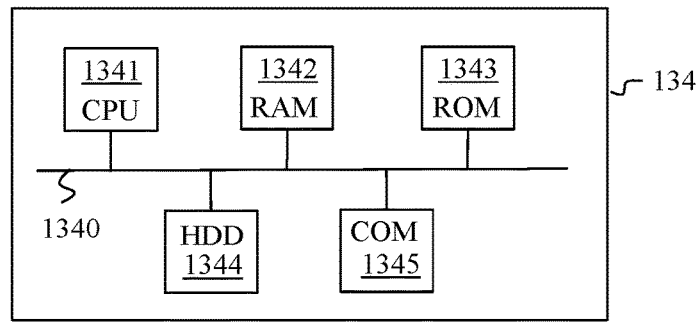
FIG. 2B illustrates schematically an example of hardware architecture of a node device in the PLC network.

FIG. 2B illustrates schematically an example of hardware architecture of a node device in the PLC network 1 implementing the invention. We take here the example of the node device 134. It should be noted that FIG. 2B could also illustrate schematically an example of hardware architecture of a processing module included in the node device 134 and implementing the invention.

According to the example of hardware architecture depicted in FIG. 2B, the node device 134 then comprises, connected by a communication bus 1340: a processor or CPU (central processing unit) 1341; a random access memory RAM 1342; a read only memory ROM 1343; a storage unit such as a hard disk or a storage medium reader, such as an SD (secure digital) card reader 1344; at least one communication interface 1345 enabling the data concentrator device to communicate with the node devices 130 to 134 to communicate with the data concentrator device 12.

The processor 1341 is capable of executing instructions loaded into the RAM 1342 from the ROM 1343, from an external memory (not shown), from a storage medium (such as an SD card), or from a communication network. When the node device 134 is powered up the processor 1341 is capable of reading instructions from the RAM 1342 and executing them. These instructions form a computer program causing the implementation, by the processor 1341, of all or part of the method described below in relation to FIGS. 3 to 6.

The method described below in relation to FIGS. 3 to 6 may be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

Figure 3:
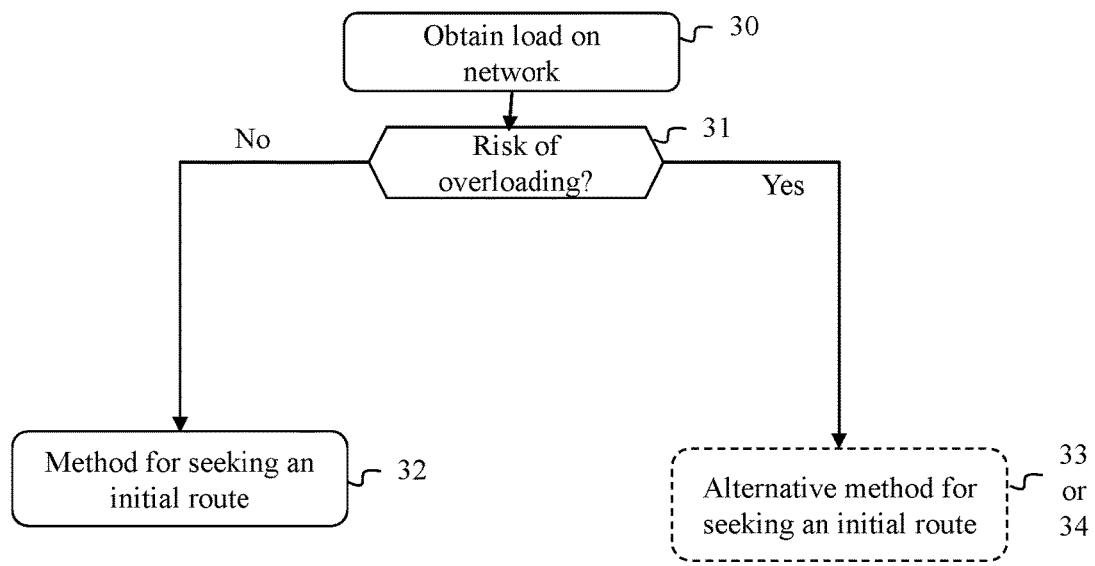
FIG. 3 illustrates schematically a method according to the invention for obtaining an initial communication between a node device and a data concentrator device.

FIG. 3 illustrates schematically a method according to the invention for obtaining an initial communication route between the node device 134 and the data concentrator device 12.

In normal operation, the data concentrator device 12 stores, in its RAM memory 122, for each node device to which it is connected, information representing a communication route to said node device. In addition, the data concentrator device 12 stores in its RAM memory 123 a Boolean variable BOOL_12 taking the value "0" when the data concentrator device 12 is powered up for the first time and as long as the PLC network 1 is not initialised, and the value "1" as soon as the PLC network 1 has been initialised at least once, i.e. as soon as each node device in the PLC network 1 has been associated at least once with a communication route. The RAM memory 122 is reinitialised whenever the electrical supply is cut off in the PLC network 1, so that the data concentrator device loses each item of information representing a communication route. The ROM memory 122, for its part, is not reinitialised by a cut in electrical supply. The ROM memory 123 can be reinitialised only by an operator. The Boolean variable BOOL_12 is therefore not modified when the electrical supply is cut off.

In a similar manner, in normal operation, the node device 134 stores in its RAM memory 1342 information representing a communication route to the data concentrator device 12. In addition, the node device 134 stores in its ROM memory 1343 a Boolean variable BOOL_134 taking the value "0" when the node device is powered up for the first time and as long as the PLC network 1 is not initialised, and the value "1" as soon as the PLC network 1 has been initialised at least once, i.e. as soon as the node device 134 has obtained a communication route to the data concentrator device 12. The RAM memory 1342 is reinitialised whenever the electrical supply is cut off in the PLC network 1, so that the node device 134 loses the information representing the communication route. The ROM memory 1343 for its part is not reinitialised by a cut in the electrical supply. The ROM memory 1343 can be reinitialised only by an operator. The Boolean variable BOOL_134 is therefore not modified when the electrical supply is cut off.

It is assumed here that the data concentrator device 12 and the node 134 regularly check the state of their respective RAM. When, during a check, the data concentrator device 12 finds that its RAM 122 no longer contains any information representing communication routes, it implements the method described in relation to FIG. 3 for the steps relating to it. Likewise, when, during a check, the node device 134 finds that its RAM 1342 no longer contains any information representing a communication route to the data concentrator device 12, it implements the method described in relation to FIG. 3 for the steps relating to it.

In a step 30, the data concentrator device 12 (or respectively the node device 134) checks the value of the Boolean variable BOOL_12 (or respectively BOOL_134).

When the variable BOOL_12 (or respectively BOOL_134) is equal to the value "0", the data concentrator device 12 (or respectively the node device 134) concludes, during a step 31, that the reinitialisation of the RAM 122 (or respectively the RAM 1342) is due to an intervention by an operator and that there is no risk of overloading of the PLC network 1. In this case, during a step 32, the data concentrator device 12 (or respectively the node device 134) implements steps concerning it of the method for seeking an initial communication route included in the G3-PLC protocol that we describe hereinafter in relation to FIG. 4.

When the variable BOOL_12 (or respectively BOOL_134) is equal to the value "1", the data concentrator device 12 (or respectively the node device 134) concludes, during a step 31, that the reinitialisation of the RAM 122 (or respectively the RAM 1342) is due to a cut in the power supply of the CPL network 1 and that following this cut in electrical supply there is a risk of overloading of the PLC network 1.

In one embodiment, when there is a risk of overloading, the data concentrator device 12 awaits an authentication message from the node device 134. When the node device 134 determines that there is a risk of overloading, it randomly draws a time value t between the value "0" and a predefined time value T and starts a clock. When the clock reaches the time value t, the node device 134 launches the steps concerning it of the method for seeking an initial communication route of the G3-PLC protocol. It is assumed here that each node device in the PLC network 1 draws a different time value t and that consequently the risk of overloading of the PLC network 1 is low when each node device launches the steps concerning it of the method of seeking an initial communication route of the G3-PLC protocol. As we shall see below in relation to FIG. 4, the steps of the method for seeking an initial communication route of the G3-PLC protocol comprise a step of sending an authentication message to the data concentrator device 12. When the data concentrator device 12 receives an authentication message from the node device 134, it can launch the steps that concern it of the method for seeking an initial communication route of the G3-PLC protocol.

It should be noted that the devices 130 to 133 function in an identical manner to the node device 134.

Figure 5:
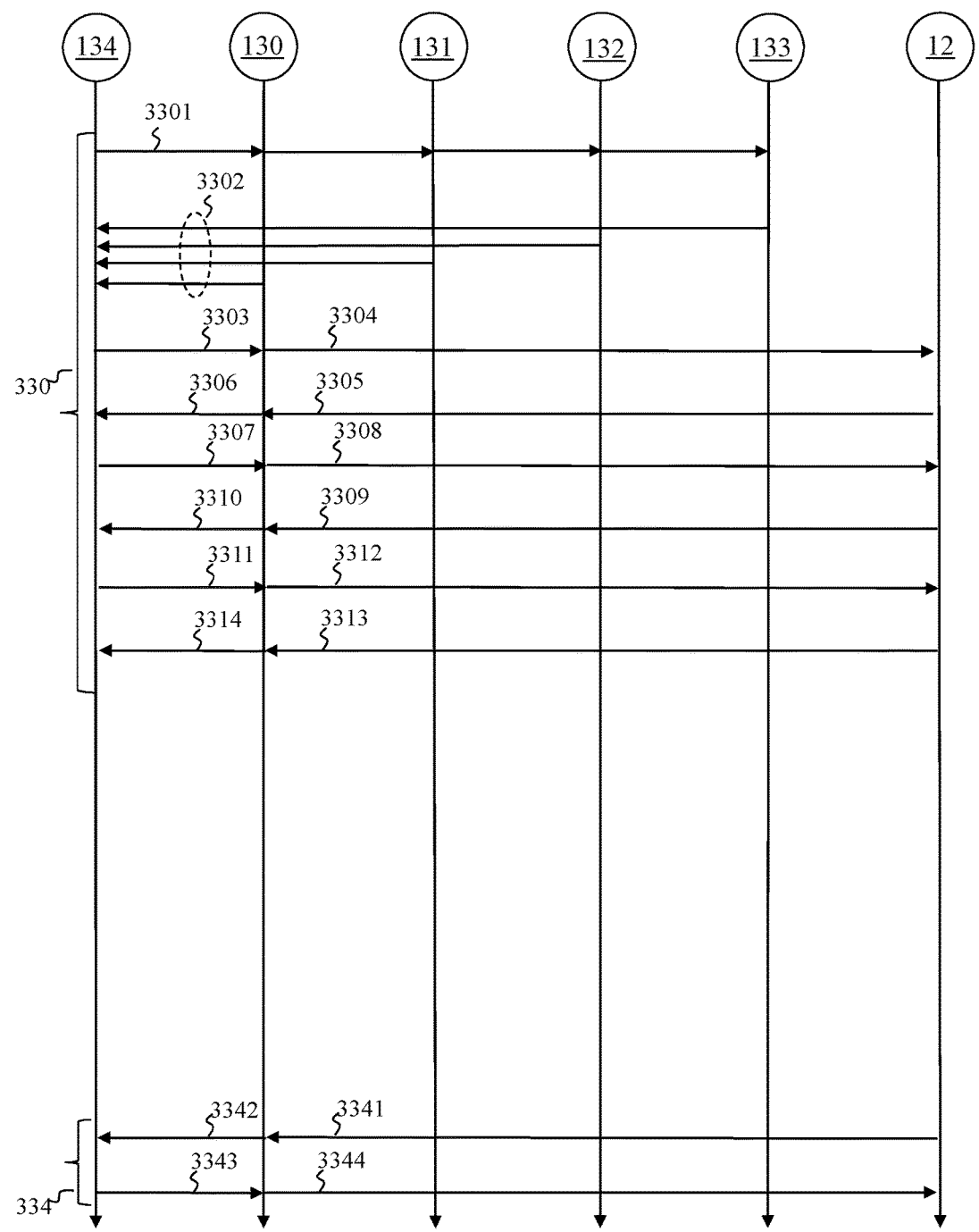
FIG. 5 illustrates schematically a first example of an alternative method for seeking an initial communication route according to the invention.

In one embodiment, when there is a risk of overloading of the PLC network 1, the data concentrator device 12 (or respectively the node device 134) implements, following step 31, during a step 33, steps concerning it of an alternative method of seeking an initial communication route described in relation to FIG. 5.

Figure 6:
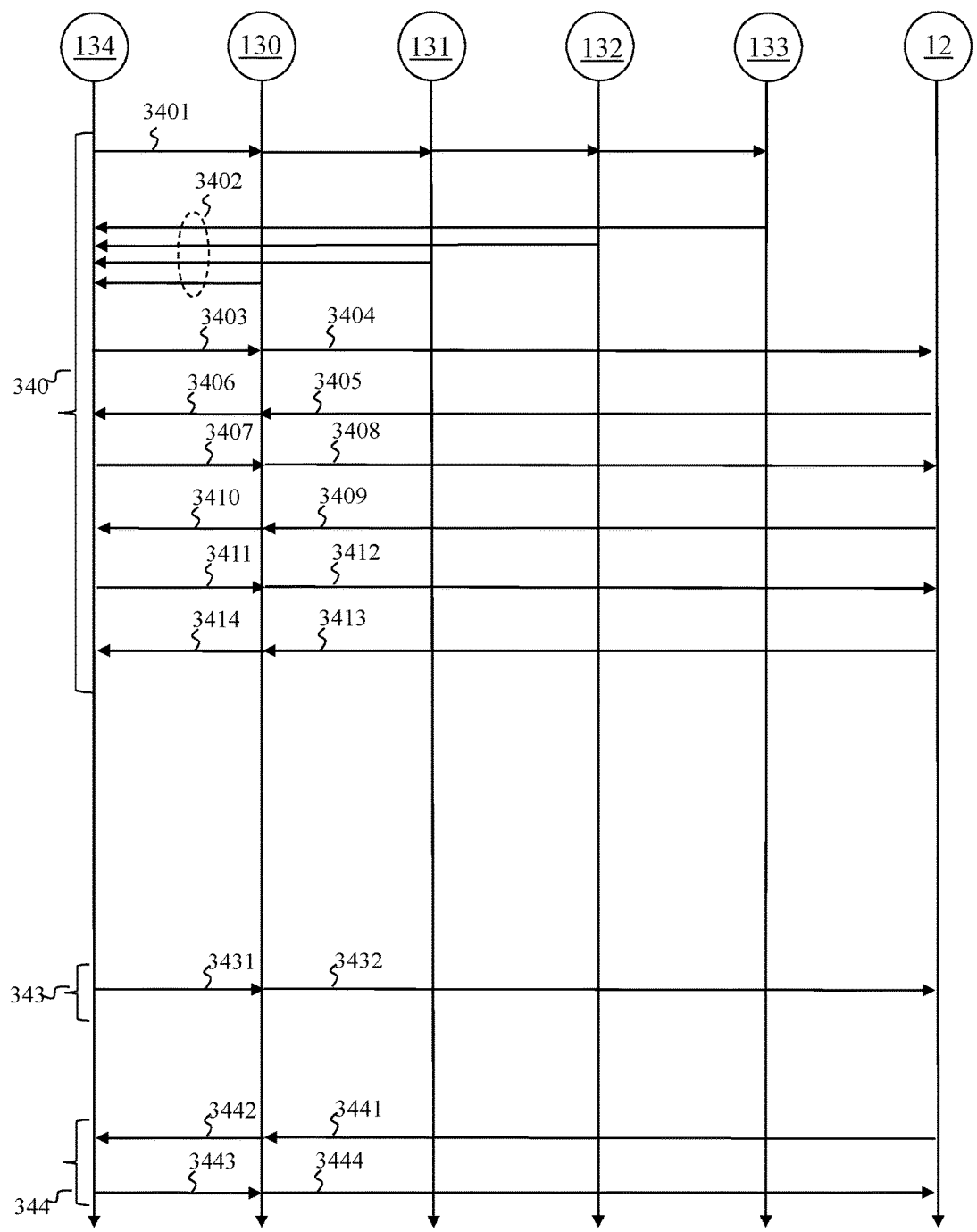
FIG. 6 illustrates schematically a second example of an alternative method for seeking an initial communication route according to the invention.

In one embodiment, when there is a risk of overloading of the PLC network 1, the data concentrator device 12 (or respectively the node device 134) implements, following step 31, during a step 34, steps concerning it of an alternative method for seeking an initial communication route described in relation to FIG. 6.

Figure 4:
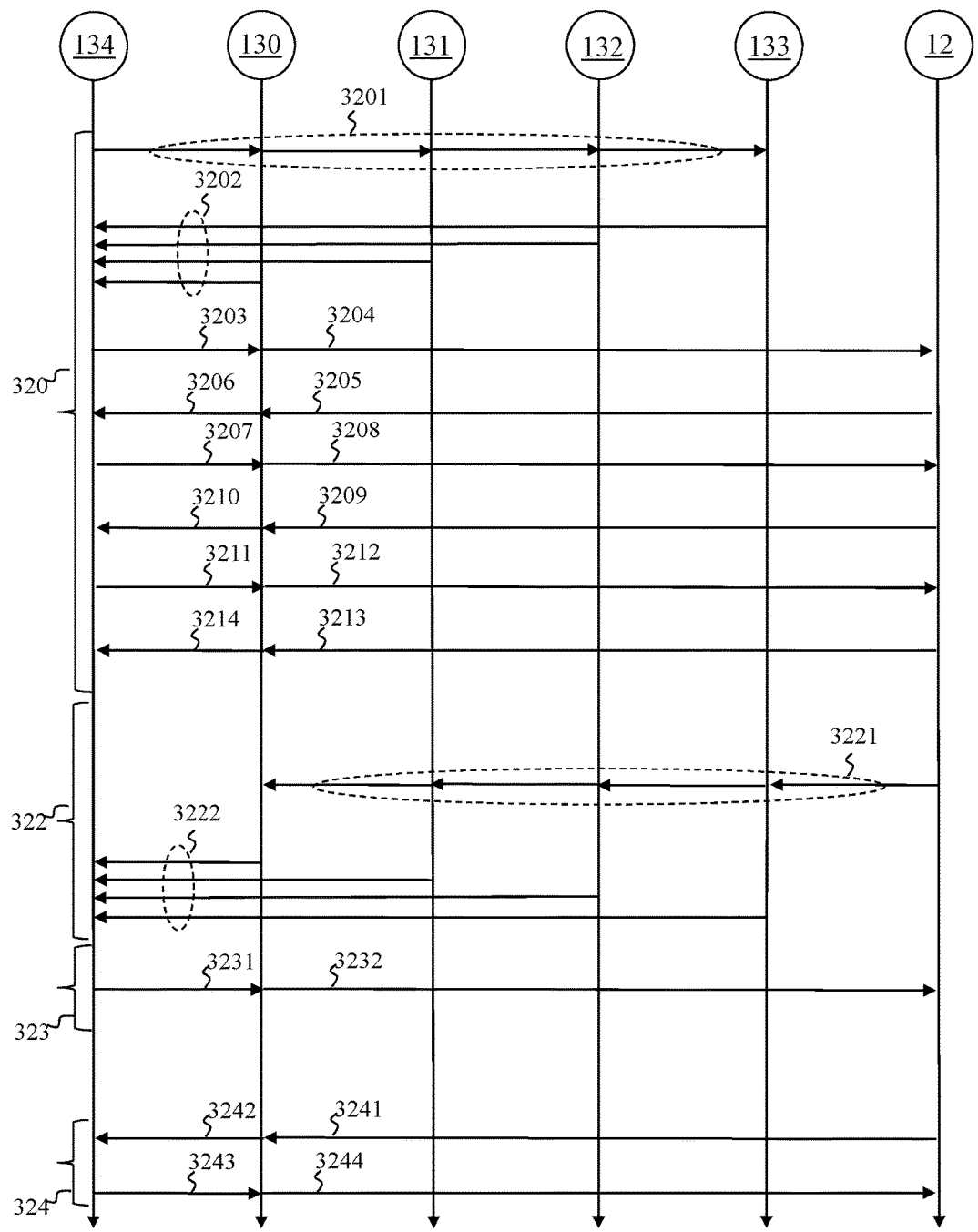
FIG. 4 illustrates schematically a method for seeking an initial communication route included in the G3-PLC protocol.

FIG. 4 illustrates schematically the method for seeking an initial communication route included in the G3-PLC protocol when it is implemented in the PLC network 1 between the node device 134 and the data concentrator device 12 during step 32.

The method for seeking an initial communication route begins with a first phase 320, referred to as the authentication phase. During the authentication phase, messages are exchanged between the node device 134 and the data concentrator device 12, so that these two devices can authenticate each other mutually. Each message exchanged during the authentication phase is done by identifying the node device 134 by its long address. In other words, each message exchanged during the authentication phase comprises a long destination address (and reciprocally a long source address) of the MAC (medium access control) address type. During the authentication phase 320, the node device 134, wishing to establish a communication route with the data concentrator device 12, sends an authentication message to the data concentrator device 12. In response to the authentication message, the data concentrator device 12 transmits a message to the node device 134 containing a short address attributed by the data concentrator device 12 to the node device 134 and corresponding to the long address of the node device 134. The short address is used in each communication between the node device 134 and the data concentrator device 12 following the authentication phase 320 in place of the long address. In the authentication phase 320, the short address, contained in the message transmitted by the data concentrator device 12 in response to the authentication message, is in a format that cannot be interpreted by an intermediate device in the network via which said message will pass. This is because the short address is transmitted in an encrypted format, the node device 134 being the only node device having means for decrypting the address, such as for example an encrypting key. For example, as we shall see hereinafter, the node device 130 by which the message containing the short address passes is not capable of interpreting the short address.

In one embodiment, the authentication phase 320 uses the EAP-PSK protocol (RFC-4764: "A Pre-Shared Key (PSK) Extensible Authentication Protocol (EAP) Method", F. Bersani (France Telecom R&DH), Tschofenig (Siemens Networks GmbH & Co), January 2007). This embodiment is described by steps 3201 to 3214.

During step 3201, the node device 134 initiates a procedure for determining a best neighbour for communicating with the data concentrator device 12 by transmitting a message BeaconReq to its direct neighbours, i.e. the node devices 130 to 133. The message BeaconReq is defined in the G3-PLC protocol, and more particularly in IEEE 802.15.4, which is the basis for the G3-PLC protocol.

In response to the message BeaconReq, each node device 130 to 133 transmits, during a step 3202, in a message BeaconResp (defined in the G3-PLC protocol) information enabling the node device 134 to determine which is the best neighbour for communicating with the data concentrator device 12. In the example described in relation to FIG. 4, the device 130 is the best neighbour. The best neighbour plays a role of intermediate agent and is known in the G3-PLC protocol by the acronym LBA ("6LoWPAN Bootstrapping Agent").

Subsequently each communication between the node device 134 and the data concentrator device 12 of the authentication phase 320 passes through the node device 130. The node device 130 serves, at least temporarily, as a relay for the node device 134.

In a step 3203, the node device 134 transmits, in unicast mode, to the node device 130, a message JOINING, defined in the G3-PLC protocol, intended for the data concentrator device 12. The message JOINING comprises the long address of the node device 134, this long address being used by the data concentrator device 12 to obtain a suitable shared encrypting key allowing to protect mutual authentication between the node device 134 and the data concentrator device 12. In a step 3204, the node device 130 retransmits, in unicast mode, the message JOINING that it received to the data concentrator device 12.

In a step 3205, the data concentrator device 12 responds to the message JOINING by sending, in unicast mode, to the node device 134, a message of the EAP-PSK first message type, described in Section 5.1 of the document RFC-4764, to the node device 130. The message of the EAP-PSK first message type comprises a random number RAND_S and an item of information ID_S representing an identity of the data concentrator device 12. In a step 3206, the node device 130 retransmits, in unicast mode, the message of the EAP-PSK first message type to the node device 134.

In a step 3207, the node device 134 responds to the message of the EAP-PSK first message type by sending, in unicast mode, to the data concentrator device 12, a message of the EAP-PSK second message type, described in Section 5.2 of the document RFC-4764, to the node device 130. The message of the EAP-PSK second message type comprises the random number RAND_S, a random number RAND_P, an item of information ID_P representing the identity of the node device 134 and a message identification code (MIC) calculated from an authentication key, random numbers RAND_S and RAND_P and information ID_S and ID_P. In a step 3208, the node device 130 retransmits, in unicast mode, the message of the EAP-PSK second message type to the data concentrator device 12. It should be noted that the message of the EAP-PSK second message type is an authentication message.

In a step 3209, the data concentrator device 12 responds to the message of the EAP-PSK second message type by sending, in unicast mode, to the node device 134, a message of the EAP-PSK third message type, described in Section 5.3 of the document RFC-4764, to the node device 130. The message of the EAP-PSK third message type comprises the random number RAND_S, an MIC calculated from an authentication key, from the random number RAND_P and from the information ID_S, and information P_CHANNEL_S_0 representing a protected channel. The information P_CHANNEL_S_0 comprises a short address attributed by the data concentrator device 12 to the node device 134 and corresponding to the long address of the node device 134. In the information P_CHANNEL_S_0, the short address appears in an encrypted format. In a step 3210, the node device 130 retransmits, in unicast mode, the message of the EAP-PSK third message type to the node device 134.

In a step 3211, the node device 134 responds to the message of the EAP-PSK third message type by sending, in unicast mode, to the data concentrator device 12, a message of the EAP-PSK fourth message type, described in Section 5.4 of the document RFC-4767, to the node device 130. The message of the EAP-PSK fourth message type comprises the random number RAND_S and information representing the protected channel P_CHANNEL_P_1. In a step 3212, the node device 130 retransmits, in unicast mode, the message of the EAP-PSK fourth message type to the data concentrator device 12.

In a step 3213, the data concentrator device 12 responds to the message of the EAP-PSK fourth message type by sending, in unicast mode, to the node device 134, a message ACCEPTED EAP SUCCESS defined in the G3-PLC protocol. In a step 3214, the node device 130 retransmits the message ACCEPTED EAP SUCCESS to the node device 134. The exchange of the message ACCEPTED EAP SUCCESS ends the authentication phase 320 and indicates that the authentication phase 320 has taken place correctly.

It should be noted that the G3-PLC protocol provides for the communication route used during the authentication phase to be able to be stored in routing tables of the devices involved in the communications between the node device 134 and the data concentrator device 12, i.e. the node device 134, the data concentrator device 12 and any intermediate devices. The communication route thus stored can serve as an initial communication route for communications between the node device 134 and the data concentrator device 12.

The authentication phase 320 is followed by a second phase, referred to as the phase for seeking a best communication route 322, derived from the G3-PLC protocol. During the phase for seeking a best communication route, messages are exchanged between the node device 134 and the data concentrator device 12 in order to define a best communication route in accordance with a predefined criterion, between the node device 134 and the data concentrator device 12. Each message exchanged during the phase for seeking a best communication route is done as a short address. In other words, each message exchanged during the phase for seeking a best communication route comprises a short destination address (and reciprocally a short source address). The short address of the data concentrator device 12 is in general a default address known to each node device in the PLC network 1. The short address of the node device 134 is the one attributed to the node device 134 by the concentrator device 12. Using short addresses allows essentially to be more economical in terms of use of bandwidth. At the start of the phase for seeking a best communication route, the best communication route between the node device 134 and the data concentrator device 12 is not known. The phase for seeking a best communication route consists of testing each possible communication route and adopting one of them. To do this, messages are transmitted in broadcast mode in the PLC network 1. In the written example in relation to FIG. 4, during the phase for seeking a best communication route 322, during a step 3221, the data concentrator device 12 sends, in broadcast mode, over the PLC network 1, a route request comprising a destination address corresponding to the short address of the node device 134. This route request is received by each node device in the PLC network 1 within range of the data concentrator device 12, i.e. the node devices 130 to 133.

A communication route between two devices in a network may comprise a single communication link, in this case said communication route directly connects the two devices, or a plurality of links, in this case the communication route passes through at least one intermediate device. The G3-PLC protocol defines the cost of a communication as a sum of costs of links making up this communication route. The route request comprises route cost information. When a device receives a route request, whether this request be intended for it or intended for another device, the device updates the route cost information contained in said request by adding thereto the cost of the last link through which said request passed.

During a step 3222 each node device that received the route request updates the route cost information and retransmits the route request in broadcast mode. The route request thus transmitted is received by each node device in the PLC network 1 within range of the node devices 130 to 133, apart from the data concentrator device 12 that originated the route request. In the example described in relation to FIG. 1, the node devices in the PLC network 1 within range of the node devices 130 to 133 comprise the node device 134. When it receives the route requests emanating from the node devices 130 to 133, the node device 134 recognises its short address. In this way, the node device 134 knows that it is the addressee of the route request that it has received. The node device 134 then updates the route cost information contained in these requests and seeks a route having minimum route cost information. The communication route associated with the minimum cost among the communication routes followed by the route request is then selected by the node device 134 to communicate with the data concentrator device 12. In the example described in relation to FIG. 4, the best communication route selected by the node device 134 passes through the node device 130.

The phase of seeking a best communication route 322 is followed by a third phase 323, referred to as the route confirmation phase. During the route confirmation phase, in a step 3231, the node device 134 transmits, to the data concentrator device 12, a message, referred to as a route reply message, comprising information representing the communication route selected by the node device 134 on the basis of the route costs that it has received. The message is transmitted using the best communication route selected by the node device 134, this communication route passing through the node device 130. When it receives the route reply message, the node device 130 stores in a routing table the communication route selected by the node device 134. In a step 3232, the node device 130 retransmits the route reply message to the data concentrator device 12 in unicast mode. On receiving the route reply message, the data concentrator device 12 is informed of the communication route selected by the node device 134. From step 3232, all the communications between the node device 134 and the data concentrator device 12 use the communication route selected by the node device 134.

The route confirmation phase is followed by a fourth phase 324, referred to as the application data exchange phase. In a step 3241, the data concentrator device 12 transmits in unicast mode a first message containing data applying to the node device 130 intended for the node device 134. In a step 3242, the node device 130 retransmits the first message to the node device 134 in unicast mode. In a step 3243, the node device 134 transmits in unicast mode a second message containing data applying to the node device 130 intended for the data concentrator device 12. In a step 3244, the node device 130 retransmits the second message to the data concentrator device 12 in unicast mode. Other steps, not shown, similar to steps 3241 to 3244 are performed during the application data exchange phase.

FIG. 5 illustrates schematically a first example of an alternative initial route search method according to the invention. The alternative initial communication route search method of FIG. 5 corresponds to step 33 described in relation to FIG. 3.

The alternative initial communication route search method of FIG. 5 comprises two phases. A first phase 330, referred to as the alternative authentication phase, is similar to the authentication phase 320 described in relation to FIG. 4. The alternative authentication phase 330 comprises steps 3301 to 3308 and 3311 to 3314 respectively identical to steps 3201 to 3208 and 3211 to 3214 described in relation to FIG. 4. In a step 3309, the data concentrator device 12 replies to the message of the EAP-PSK second message type by sending, in unicast mode, to the node device 134, a message similar to the message of the EAP-PSK third message type referred to as a substitute EAP-PSK third message type, to the node device 130. Said message of the substitute EAP-PSK third message type comprises the random number RAND_S, an MIC calculated from an authentication key, from the random number RAND_P and from the information ID_S and information P_CHANNEL_S_0 representing a protected channel. However, whereas the information P_CHANNEL_S_0 included in the message of the EAP-PSK third message type comprises a short address attributed to the node device 134 in a format that cannot be interpreted by an intermediate device through which the message of the EAP-PSK third message type passes, the information P_CHANNEL_S_0 included in the message of the substitute EAP-PSK third message type comprises a short address attributed to the node device 134 in a format that can be interpreted by an intermediate device through which the substitute EAP-PSK third message type passes. In one embodiment, the short address is not encrypted in the message of the substitute EAP-PSK third message type. In a step 3310, the node device 130 transmits the message of the substitute EAP-PSK third message type in unicast mode to the node device 134. When an intermediate device, such as the device 130, receives a message of the substitute EAP-PSK third message type, it is capable of recovering the short address attributed to the node device 134. Knowing the short address attributed to the node device 134, when the node device 130 receives a message indicating a destination address corresponding to the short address of the node device 134, the node device 130 is capable of correctly routing said message to the node device 134. With a message of EAP-PSK third message type, the node device 130 would not have been capable of recovering the short address attributed to the node device 134 and therefore, in the phase of seeking a best communication route 322, the node device would not have been capable of correctly routing a message indicating a destination address corresponding to the short address of the node device 134.

When the message ACCEPTED EAP SUCCESS is sent during step 3313, the data concentrator 12 stores the communication route to the node device 134 passing through the node 130 since this communication route was used during the authentication phase. Likewise, the node 130, on reception of the message ACCEPTED EAP SUCCESS during step 3313, stores in a routing table a communication route to the short address of the node device 134, passing through the next node leading to the long address of the node 134 (in this case, it is the node device 134 itself). This match between the communication route to the long address of the node device 134 and the corresponding short address was already known to the node device 134 as soon as the message of the substitute EAP-PSK third message type was received during step 3309.

The alternative authentication phase 330 is followed by an application data exchange phase 334. This application data exchange phase 334 comprises steps 3341 to 3344 respectively similar to steps 3241 to 3244. The only difference between steps 3341 to 3344 and steps 3241 to 3244 being that the communication route used is the communication route defined during steps 3313 and 3314 rather than a communication route selected during a phase for seeking a best communication route.

FIG. 6 illustrates schematically a second example of an alternative initial communication route search method according to the invention. The example of an alternative communication route search method in FIG. 6 corresponds to step 34 described in relation to FIG. 3.

The alternative initial communication route search method in FIG. 6 comprises three phases. A first phase 340 is an authentication phase identical to the authentication phase 320. The authentication 340 comprises steps 3401 to 3414 respectively identical to steps 3201 to 3214.

The authentication phase 340 is followed by an alternative route confirmation phase 343. The alternative route confirmation phase 343 is similar to the route confirmation phase 323. During a step 3431, the node device 134 transmits, in unicast mode, to the data concentrator device 12, a route reply message comprising information representing the communication route defined during steps 3401 and 3402. This is because, instead of choosing a communication route to the data concentrator device 12 on the basis of a comparison of route costs received in route requests, the node device 134 transmits the route reply message to the node device 130. The choice of the node device 130 by the node device 134 is guided by the fact that the node device 134 knows that the node device 130 has available an operational communication route to the data concentrator device 12 since all the messages exchanged during the authentication phase 340 passing through the node 130 were exchanged successfully. The node device 130, on receiving the route reply message during step 3431, is capable of using information contained in the route reply message, and in particular of recovering the short address of the node device 134 contained in the route reply message in a format that can be interpreted by the node device 130, in order to store a communication route to the short address of the node device 134, and to route the route confirmation message to the data concentrator device 12. Thus, when the node 130 receives a message comprising a destination address corresponding to the short address of the node device 134, it is capable of suitably routing this message to the node device 134. In a step 3432, the node device retransmits the route reply message in unicast mode to the data concentrator device 12. Moreover, on receiving the route reply message, the data concentrator device 12 is informed of the communication route to be used for communicating with the node device 134. As from step 3432, all the communications between the node device 134 and the data concentrator device 12 use the communication route defined during steps 3401 and 3402.

It is therefore noted that the route confirmation phase 343 is used by the node device 134 and the data concentrator device 12 without a phase of seeking a best communication route equivalent to the phase of seeking a best communication route 322 having been implemented. The authentication phase 340 and the route confirmation phase 343 are therefore consecutive.

The alternative route confirmation phase 343 is followed by an application data exchange phase 344. This application data exchange phase 344 comprises steps 3441 to 3444 respectively similar to steps 3241 to 3244. The only difference between steps 3341 to 3444 and steps 3241 to 3244 being that the communication route used is the communication route defined during steps 3401 and 3402 rather than a communication route selected during a phase of seeking a best communication route.

In the embodiment described in relation to FIG. 6, the data concentrator device 12 delays the sending of the message containing application data during step 3441 in order to leave the node device 134 sufficient time to implement the alternative route confirmation phase 343. After a predefined period, in the absence of reception of the route confirmation message, and therefore without any valid communication route to the node 134, the data concentrator device 12 implements the steps that concern it of the phase of seeking a best communication route 322, in order to obtain a communication route with the node device 134. The data concentrator device 12 next implements the steps that concern it of the phases of route confirmation 323 and application data exchange 134. In parallel, the node device 134 implements the steps that concern it of the phases of seeking a best route 322, route confirmation 323 and application data exchange 324.

In one embodiment, the phase of seeking a best communication route is implemented by the node device 134 and the data concentrator device 12 following step 33 or 34 when the risk of overloading the network has become low once again. Thus, after implementation of the phase of seeking a best communication route, a best communication route replaces the initial communication route obtained by the alternative initial route search method. This may be done after a random time for each node device, after an initial communication route has been obtained. This avoids all the node devices transmitting a route request, in broadcast mode, simultaneously.

The data concentrator device 12 may also observe the incoming (authentications) and outgoing (node device interrogation requests) data traffic and decide to implement the phase of seeking a best communication route 322 when the traffic is below a predefined threshold.

The invention claimed is:

1. A method for obtaining an initial communication route between a node device and a data concentrator device in a network using powerline communications based on a communication protocol comprising a method for seeking an initial communication route, said method comprising a first phase, referred to as the authentication phase, during which a first device wishing to establish a communication route to a second device sends an authentication message to said second device, in response to which said second device transmits a message to said first device comprising a short address attributed to said first device in a format that cannot be interpreted by an intermediate device in the network via which said message will pass, said short address being used for each exchange of messages between the first and second devices following the authentication phase, a second phase, referred to as the phase for seeking a best communication route, during which said second device sends a route request in broadcast mode in the network, and a third phase, referred to as the route confirmation phase, during which the first device and the second device exchange a messagecomprising information representing a communication route selected in accordance with a predefined criterion, wherein said method comprises:

applying said method for seeking an initial communication route in order to determine the initial communication route when a predefined condition is fulfilled and, when the predefined condition is not fulfilled, an alternative method of seeking an initial communication route is applied, the alternative method of seeking an initial communication route comprising two phases, a first phase corresponding to the authentication phase and a second phase corresponding to the route confirmation phase, the first phase and the second phase being consecutive.

2. The method according to claim 1, wherein the predefined condition is an absence of risk of overloading of said network.

3. The method according to claim 1, wherein the second phase corresponding to the route confirmation phase is implemented as soon as a message containing the first phase corresponding to the authentication phase is received by the node device.

4. The method according to claim 1, wherein the communication protocol is the G3-PLC protocol.

5. A method for obtaining an initial communication route between a node device and a data concentrator device, the node device and the data concentrator device being included in a network using powerline communications based on a communication protocol comprising a method for seeking an initial communication route, said method comprising a first phase, referred to as the authentication phase, during which a first device using the method and wishing to establish a communication route to a second device sends an authentication message to said second device, in response to which the first device receives a message comprising a short address attributed to the first device by the second device in a format that cannot be interpreted by an intermediate device in the network via which said message will pass, said short address being used for each exchange of messages between the first and second devices following the authentication phase, a second phase, referred to as the phase for seeking a best communication route, during which the first device selects a best communication route in accordance with a predefined criterion from a set of possible communication routes between the first device and the second device, and a third phase, referred to as the route confirmation phase, during which the first device and the second device exchange a message comprising information representing the best communication route selected, wherein said method comprises:

applying said method for seeking an initial communication route in order to determine the initial communication route when a predefined condition is fulfilled and, when the predefined condition is not fulfilled, an alternative method of seeking an initial communication route is applied, the alternative method of seeking an initial communication route comprising two phases, a first phase corresponding to the authentication phase and a second phase corresponding to the route confirmation phase, the first phase and the second phase being consecutive.

6. A computer program product comprising non-transitory storage medium that comprises instructions for the implementation, by a device, of the method according to claim 5, when said program is executed by a processor of said device.

7. A non-transitory storage medium storing a computer program comprising instructions for the implementation, by a device, of the method according to claim 5, when said program is executed by a processor of said device.

8. A method for obtaining an initial communication route between a node device and a data concentrator device, the data concentrator device and the node device being included in a network using powerline communications based on a communication protocol comprising a method for seeking an initial communication route, said method comprising a first phase, referred to as the authentication phase, during which a second device executing said method receives a message for authentication of a first device wishing to establish a communication route with the second device, in response to which the second device transmits a message to the first device comprising a short address attributed to the first device in a format that cannot be interpreted by an intermediate device in the network via which said message will pass, said short address being used for each exchange of messages between the first and second device following the authentication phase, a second phase, referred to as the phase for seeking a best communication route, during which the second device sends a route request in broadcast mode in the network, and a third phase, referred to as the route confirmation phase, during which the second device and the second device exchange a message comprising information representing a best communication route selected by the first device in accordance with a predefined criterion, wherein said method comprises:

applying said method for seeking an initial communication route in order to determine the initial communication route when a predefined condition is fulfilled and, when the predefined condition is not fulfilled, an alternative method of seeking an initial communication route is applied, the alternative method of seeking an initial communication route comprising two phases, a first phase corresponding to the authentication phase and a second phase corresponding to the route confirmation phase, the first phase and the second phase being consecutive.

9. A system suitable for obtaining an initial communication route, said system being included in a network using powerline communications based on a communication protocol comprising a method for seeking an initial communication route, said method comprising a first phase, referred to as the authentication phase, during which a first device wishing to establish a communication route to a second device sends an authentication message to the second device, in response to which the second device transmits a message to the first device comprising a short address attributed to the first device in a format that cannot be interpreted by an intermediate device in the network via which said message will pass, said short address being used for each exchange of messages between the first and second devices following the authentication phase, a second phase, referred to as the phase for seeking a best communication route, during which the second device sends a route request in broadcast mode in the network, and a third phase, referred to as the route confirmation phase, during which the first device and the second device exchange a message comprising information representing a best communication route selected in accordance with a predefined criterion, wherein said system comprises circuitry adapted for:

applying said method for seeking an initial communication route in order to determine the initial communication route when a predefined condition is fulfilled and, when the predefined condition is not fulfilled, for applying an alternative method of seeking an initial communication route, the alternative method of seeking an initial communication route comprising two phases, a first phase corresponding to the authentication phase and a second phase corresponding to the route confirmation phase, the first phase and the second phase being consecutive.

10. A node device suitable for obtaining an initial communication route to a data concentrator device, said node device and said data concentrator device being included in a network using powerline communications based on a communication protocol comprising a method for seeking an initial communication route, said method comprising a first phase, referred to as the authentication phase, during which a first device using the method and wishing to establish a communication route to a second device sends an authentication message to said second device, in response to which the first device receives a message comprising a short address attributed to the first device by the second device in a format that cannot be interpreted by an intermediate device in the network via which said message will pass, said short address being used for each exchange of messages between the first and second devices following the authentication phase, a second phase, referred to as the phase for seeking a best communication route, during which the first device selects a best communication route in accordance with a predefined criterion from a set of possible communication routes between the first device and the second device, and a third phase, referred to as the route confirmation phase, during which the first device and the second device exchange a message comprising information representing the best communication route selected, wherein said node device comprises circuitry adapted for:

applying said method for seeking an initial communication route in order to determine the initial communication route when a predefined condition is fulfilled and, when the predefined condition is not fulfilled, an alternative method of seeking an initial communication route is applied, the alternative method of seeking an initial communication route comprising two phases, a first phase corresponding to the authentication phase and a second phase corresponding to the route confirmation phase, the first phase and the second phase being consecutive.

11. A data concentrator device suitable for obtaining an initial communication route between a node device and the data concentrator device, the data concentrator device and the node device being included in a network using powerline communications based on a communication protocol comprising a method for seeking an initial communication route, said method comprising a first phase, referred to as the authentication phase, during which a second device executing the method receives an authentication message from a first device wishing to establish a communication route with the second device, in response to which said second device transmits a message to said first device comprising a short address attributed to the first device by the second device in a format that cannot be interpreted by an intermediate device in the network via which said message will pass, said short address being used for each exchange of messages between the first and second devices following the authentication phase, a second phase, referred to as the phase for seeking a best communication route, during which the second device sends a route request in broadcast mode in the network, and a third phase, referred to as the route confirmation phase, during which the second device exchange a message with the first device comprising information representing a best communication route selected by the first device in accordance with a predefined criterion, wherein said data concentrator device comprises circuitry adapted for:

applying said method for seeking an initial communication route in order to determine the initial communication route when a predefined condition is fulfilled and, when the predefined condition is not fulfilled, an alternative method of seeking an initial communication route is applied, the alternative method of seeking an initial communication route comprising two phases, a first phase corresponding to the authentication phase and a second phase corresponding to the route confirmation phase, the first phase and the second phase being consecutive.

\* \* \* \* \*